(12) United States Patent
Lundgren

(10) Patent No.: US 7,532,417 B2
(45) Date of Patent: May 12, 2009

(54) DUAL FIELD OF VIEW LENS SYSTEM

(75) Inventor: Mark A Lundgren, Fullerton, CA (US)

(73) Assignee: The Boeing Company, Chicago, IL (US)

( * ) Notice: Subject to any disclaimer, the term of this patent is extended or adjusted under 35 U.S.C. 154(b) by 8 days.

(21) Appl. No.: 11/844,000

(22) Filed: Aug. 23, 2007

(65) Prior Publication Data
US 2007/0291374 A1 Dec. 20, 2007

Related U.S. Application Data

(63) Continuation of application No. 11/422,765, filed on Jun. 7, 2006, now Pat. No. 7,307,801.

(51) Int. Cl.
G02B 9/14 (2006.01)
G02B 15/14 (2006.01)
G02B 13/18 (2006.01)
G02B 3/02 (2006.01)

(52) U.S. Cl. .................. 359/785; 359/709; 359/684; 359/690

(58) Field of Classification Search .............. 359/676, 359/690, 708, 709, 784, 786, 787, 684
See application file for complete search history.

(56) References Cited

U.S. PATENT DOCUMENTS 3,632,188 A 1/1972 Nakamura
4,183,626 A 1/1980 Rogers
4,749,265 A 6/1988 Hattori et al.
4,995,707 A 2/1991 Hashimoto
6,038,084 A 3/2000 Okada
6,046,852 A 4/2000 Konno et al.
6,459,536 B2 10/2002 Kashiki
2002/0191303 A1 12/2002 Yamakawa
2003/0206352 A1 11/2003 Mihara
2004/0161228 A1 8/2004 Nanba
2005/0219712 A1 10/2005 Yakita

OTHER PUBLICATIONS

Shih, Albert Y., and Shih, Chun-Ching. Vector Analysis of Fast Focusing by Hyperboloc and Spherical Lenses (abstract). Proceedings of SPIE, vol. 3889 (Apr. 2000), p. 842-848.
Lengeler, B., et al. Parabolic Refractive x-ray lenses (abstract). Journal of Synchrotron Radiation, vol. 9 (2002), p. 119-124.

Primary Examiner—Alicia M Harrington
(74) Attorney, Agent, or Firm—Evan Law Group LLC

(57) ABSTRACT

A dual field of view lens system comprising a first lens group aligned along an optical axis and a third lens group aligned along the optical axis and positioned a predetermined distanced from the first lens group. A second lens group, having an optical stop attached thereto, is aligned along the optical axis and disposed between the first and third lens groups such that the second lens group and the optical stop are moveable along the optical axis between a first position and a second position. Positioning the second lens group and the optical stop in the first position provides a wide field of view and moving the second lens group and the optical stop to a second position provides a narrow field of view.

24 Claims, 2 Drawing Sheets

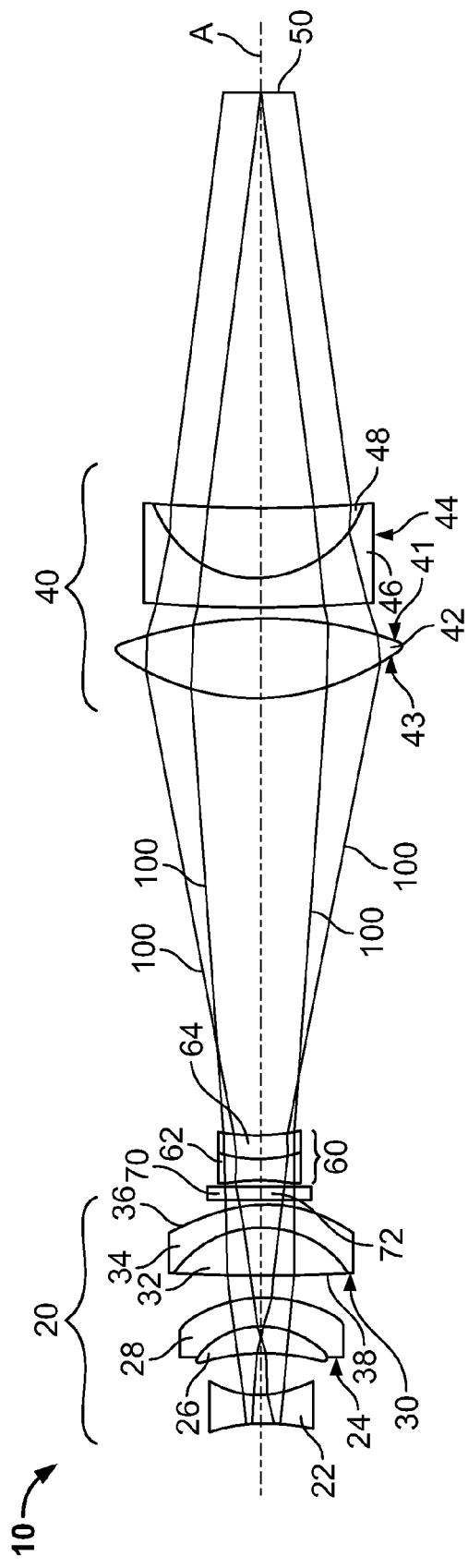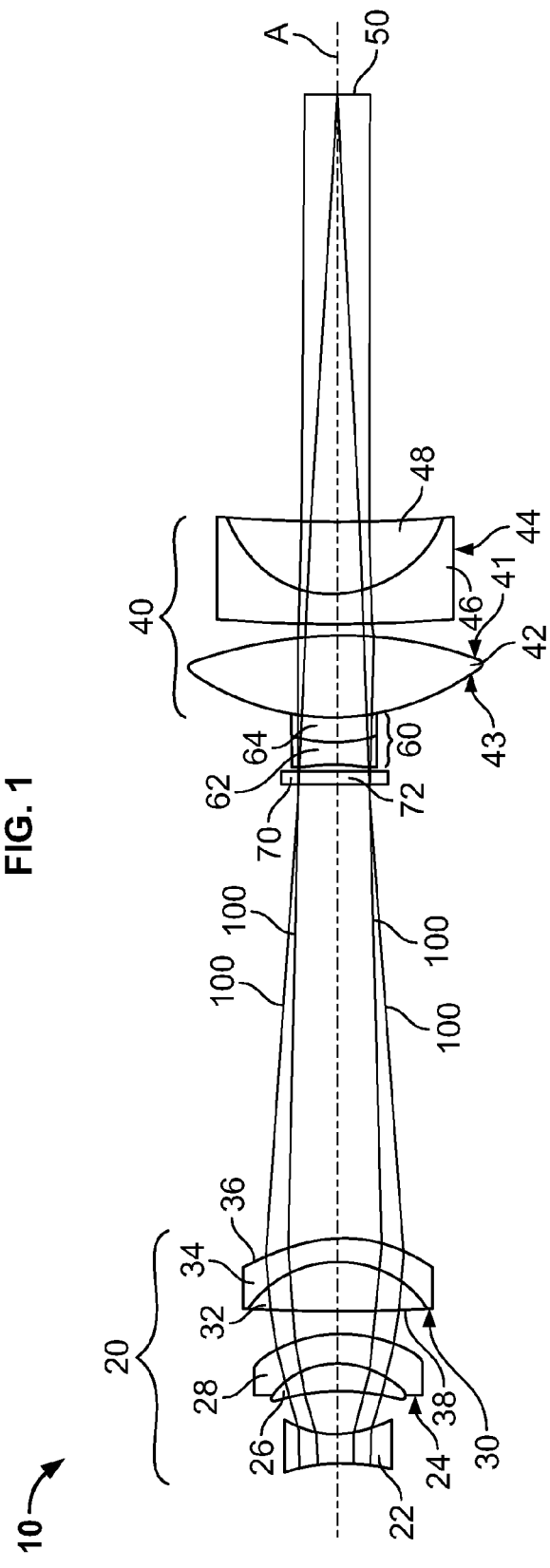

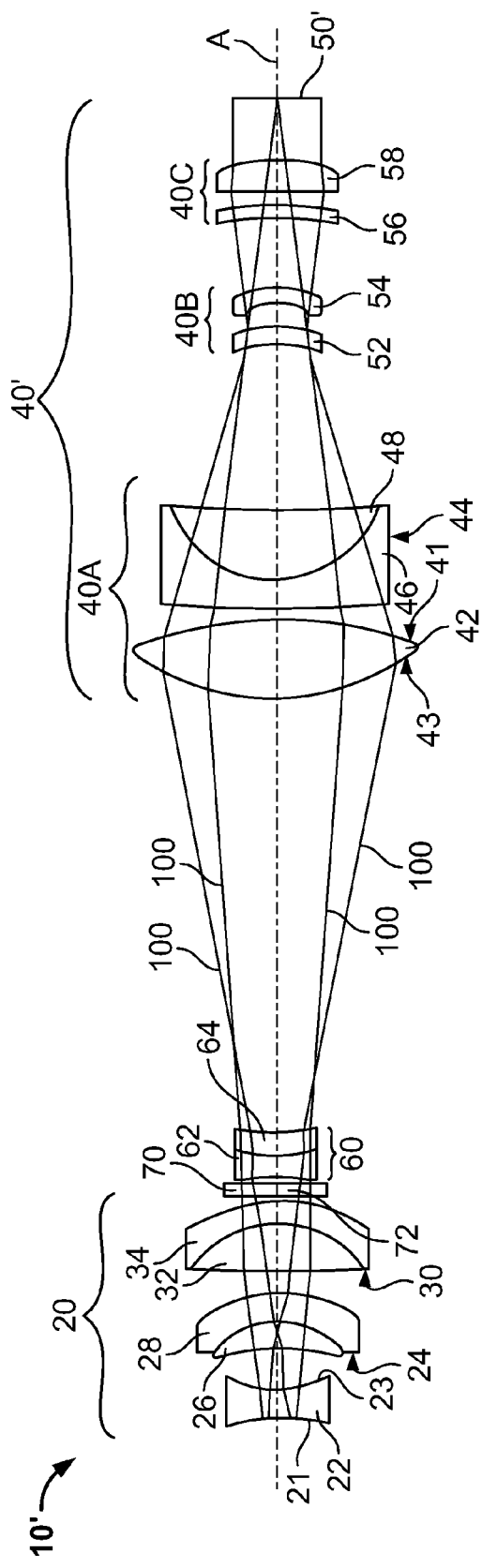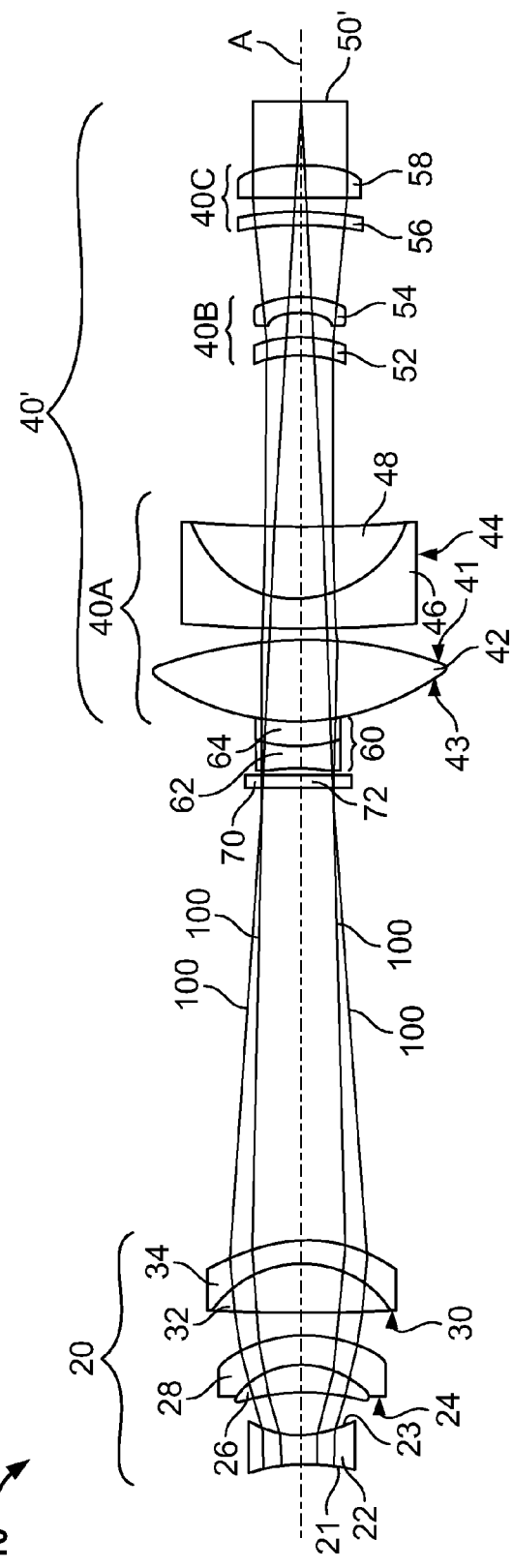

DUAL FIELD OF VIEW LENS SYSTEM

CROSS-REFERENCE TO RELATED APPLICATIONS

This application is a continuation of U.S. patent application Ser. No. 11/422,765, filed Jun. 7, 2006, which is incorporated herein by reference.

FIELD OF THE INVENTION

This invention relates generally to optical lens systems and in particular to a dual field of view lens system.

BACKGROUND

In lens systems for military, marine, industrial, outer space, or other rugged use, various machine vision systems having zoom and focus capability are used. However, one problem with these systems is that typical commercial zoom and focus lenses have mechanisms that are not sufficiently robust for these uses.

One possible solution is to use multiple cameras and lens systems instead of using one lens system. Some disadvantages to this approach are the increased cost, volume, and mass of having multiple cameras and lens systems.

Another possible solution is to use standard commercial lens systems that have mechanical devices to zoom the lens. One disadvantage to this approach is that a failing commercial lens system cannot be repaired or replaced in unmanned situations and these lens systems tend to mechanically fail due to shock, extreme changes in temperature, etc. Attempting to make these types of lens systems more robust makes these lens systems tend to be large and complicated (e.g. most lens systems require three or more independent lens group motions to operate).

There have been single motion zoom lens systems used previously, however, these systems have been used for infrared systems and the image quality has not been suitable for visible light applications.

Therefore, there is a need for a low risk, single unit, zoom and focus lens with sufficient quality for use in a visible spectrum camera. While the examples shown herein are discussed as for use in the visible spectrum, it is understood that they also apply to systems using portions of the UV and NIR spectrums as well.

SUMMARY OF THE INVENTION

The present invention relates to a dual field of view lens system. The system has a first lens group aligned along an optical axis and a third lens group aligned along the optical axis and positioned a predetermined distance from the first lens group. A second lens group is aligned along the optical axis between the first and third lens groups and is moveable along the optical axis between a first position and a second position. An optical stop is attached to the second lens group.

The present invention also relates to a method of making a dual field of view lens system. A first lens groups is positioned along an optical axis and a third lens group is positioned along the optical axis a predetermined distance from the first lens group. An optical stop is connected to a second lens group and the second lens group and the optical stop are positioned between the first and third lens groups such that they are moveable along the optical axis between first and second positions.

The present invention also relates to a method of using a dual field of view lens system. A second lens group and an optical stop are positioned in a first position between a first lens group and a third lens group to obtain a wide field of view and the second lens group and the optical stop are moved to a second position between the first lens group and the third lens group to obtain a narrow field of view.

BRIEF DESCRIPTION OF THE DRAWINGS

FIG. 1 is a side view of one example of a dual field of view lens system of the present invention with the second lens group and optical stop in a first position.

FIG. 2 is a side view of the dual field of view lens system of FIG. 1 with the second lens group and optical stop in a second position.

FIG. 3 is a side view of a second example of a dual field of view lens system of the present invention with the second lens group and optical stop in a first position.

FIG. 4 is a side view of the dual field of view lens system of FIG. 3 with the second lens group and optical stop in a second position.

DETAILED DESCRIPTION

Referring to FIGS. 1 and 2, an exemplary dual field of view zoom lens system 10 is shown. In the example shown, the system 10 generally has a first lens group 20, a second lens group 60, a third lens group 40, and an optical stop 70. As is well known in the art, each lens "group" can consist of a single lens or can be made up of multiple lenses, depending on the usage and requirements of the system.

First and third lens groups 20, 40 are aligned along an optical axis A and their positions relative to each other and to focal plane 50 are fixed. Second lens group 60 is aligned along optical axis A between first lens group 20 and third lens group 40 and is movable linearly between a first position (shown in FIG. 1) and a second position (shown in FIG. 2), for example through a linear drive screw, a worm-gear drive with a stepper motor, or any other well know device for providing linear motion to a lens group. Optical stop 70 is connected to second lens group 60 such that optical stop 70 moves along with second lens group 60.

In the example shown, first lens group 20, which is sometimes referred to as the "imaging" lens group, has singlet lens 22, first doublet lens 24, and second doublet lens 30, which have the properties listed in Table 1 below. Singlet lens 22 is bi-concave, first doublet lens 24 is a compound meniscus lens, and second doublet lens 30 is a compound bi-convex lens. As can be seen from Table 1, the surfaces of singlet lens 22 and first doublet lens 24 are spherical. In addition, surface 38 of second doublet lens 30 is spherical and surface 36 is a conic. By making surface 36 a conic, finer control of spherical aberration or coma at the narrow field of view setting (when surface 36 is filled) is accomplished. Alternatively, other combinations of spherical and conic (or higher order aspheric) surfaces may be used, depending on the requirements of system 10 and manufacturing constraints such as cost.

The example shown, system 10 operates on the principal that a lens with two finite conjugate planes at different finite focal lengths can be moved to a second location while still mapping those same two conjugate planes, but reversing magnification between them. In the examples discussed herein, second lens group 60 acts as the moving lens. The two conjugate planes are the image of first lens group 20 and the object of third lens group 40. Reversing the magnification results in the two different fields of view. The two conjugate planes may be real or virtual, and forming aerial images is not required.

By using the lens described above for the first lens group 20, first lens group 20 has positive power. However, other lenses or combinations of lenses could be used such that first lens group 20 would be of negative power, as long as first lens group 20 forms an image (real or virtual) of the object being imaged at a reasonable distance from second lens group 60. Similarly, as discussed below, second lens group 60 or third lens group 40 could be positive or negative. The positive-negative-positive configuration of exemplary system 10 discussed herein tends to result in very compact forms.

Third lens group 40, which is sometimes referred to as the "focus" lens group, has a singlet lens 42 and a doublet lens 44, which have the properties listed in Table 1 below. Singlet lens 42 is a bi-convex lens and doublet lens 44 is a compound meniscus lens. As can be seen from Table 1, the surfaces of doublet lens 44 are spherical. In addition, surface 41 of singlet lens 42 is spherical and surface 43 is a conic. By making surface 43 a conic, finer control of spherical aberration or coma at the narrow field of view setting (when surface 43 is filled) is accomplished. Alternatively, other combinations of spherical and conic (or higher order aspheric) surfaces may be used, depending on the requirements of system 10 and manufacturing constraints such as cost.

By using the lenses described above for third lens group 40, third lens group 40 has positive power. However, other lenses or combinations of lenses could be used such that third lens group 40 would be of negative power, as long as third lens group 40 forms an image (real or virtual) of the object being imaged at a reasonable distance from second lens group 60.

Second lens group 60, which is sometimes referred to as the "zoom" lens group, has a doublet lens formed by lens 62 and lens 64, which form a compound bi-concave lens and have the properties listed in Table 1 below. As can be seen from Table 1, the surfaces of lenses 62, 64 are spherical. Alternatively, the surfaces of lenses 62, 64 could be any combination of spherical and conical surfaces depending on the usage and requirements of the system 10. By using the lenses described above for second lens group 60, second lens group 60 has negative power. Alternatively, other lenses or combinations of lenses could be used such that second lens group 60 would be of positive power.

In the example shown, optical stop 70 has a fixed size aperture 72. By having a fixed size aperture 72 and connecting optical stop 70 to second lens group 60, optical stop 70 shapes the light paths 100 between first lens group 20 and third lens group 60, as described in more detail below.

Referring specifically to FIG. 1, second lens group 60 is located in a first position, proximate first lens group 20. When in this position, second lens group 60 is farther from the image being formed by first lens group 20 (which would be to the right of system 10) and diverges the light paths 100 exiting first lens group 20, forming a virtual image (in the vicinity of first lens group 20) for third lens group 40 to relay to the image plane 50. This results in a shorter focal length or wide field of view (low magnification), which uses the central portion of first lens group 20 is used and the majority (central and outer portions) of third lens group 40. Further, in this first position, the system f/# is controlled by optical stop 70 and the size of third lens group 40, which may be used to vignette the light to improve image performance in the extreme field. The image can be focused by moving second lens group 60 and optical stop 70 about the first position to focus the image. The focus motion in this example is very small (e.g. approximately 0.2 mm) compared to the 53 mm second lens group 60 travels to change the field of view and the same linear motion device can control the field of view and the focus.

Referring specifically to FIG. 2, second lens group 60 is located in a second position, proximate third lens group 40. When in this position, second lens group 60 is closer to the image being formed by first lens group 20 (which would be to the right of system 10). The virtual image formed by second lens group 60 is in the same location (vicinity of first lens group 20), but has a lower magnification. This results in a longer focal length or narrow field of view (high magnification) for the same image plane 50 size. Further, in this position, the system f/# is controlled by stop 70 and the size of first lens group 20, which may be used to vignette the light to improve image performance in the extreme field. Similarly, the image can be focused by moving second lens group 60 and optical stop 70 about the second position to focus the image. Therefore, changing the field of view of system 10 requires only a single linear movement of second lens group 60 and optical stop 70 from the first position to the second position.

In order to optimize system 10 for use with wide and narrow field of view, the curvatures of the lenses in the first, second, and third lens groups 20, 60, 40 are optimized for use with the entire lens (outer and central portions). This optimizes the performance of the system when an entire lens is used and minimizes the distortion encountered when only the

TABLE 1

| Component | Radius of Curvature | Thickness (NFOV) | Thickness (WFOV) | Glass | Aperture | Conic |
|---|---|---|---|---|---|---|
| First Lens Group 20 | −20.05362 | 3.5 | | BK7 | 12.6 | 0 |
| | 14.93529 | 4.9 | | AIR | 12.6 | 0 |
| | −32.26625 | 3.5 | | BK7 | 15.4 | 0 |
| | −9.462314 | 3.5 | | F2 | 15.4 | 0 |
| | −16.63787 | 2.8 | | AIR | 19.6 | 0 |
| | 118.8371 | 5.6 | | BK7 | 21 | 0 |
| | −13.33854 | 2.8 | | F2 | 21 | 0 |
| | −20.51888 | 55.92987 | 2.2095 | AIR | 22.4 | 0.218654 |
| Optical Stop 70 | INFINITY | 0.7 | | AIR | 8.2 | |
| Second Lens Group 60 | −30.514 | 2.8 | | BK7 | 9.8 | 0 |
| | 12.68649 | 2.8 | | F2 | 9.8 | 0 |
| | 27.0632 | 0.1403 | 53.8606 | AIR | 9.8 | 0 |
| Third Lens Group 40 | 23.88007 | 9.8 | | BK7 | 35 | −1.485753 |
| | −48.59682 | 1.4 | | AIR | 35 | 0 |
| | −4281.123 | 3.5 | | F2 | 28 | 0 |
| | 14.34499 | 8.4 | | BK7 | 25.2 | 0 |
| | −547.5901 | 48.1314 | | AIR | 25.2 | 0 | central portion of a lens is used. The use of conic surfaces on some of the lenses, as described above, also enhances this improvement as conic surfaces offer significant variation in curvature between the inner and outer portions of the lenses. Another benefit of moving the optical stop 70 with second lens group 60 is that the brightness at both positions is similar. Optimization of the curvature of the lenses in this matter provides better image quality, resolution, and clarity and allows system 10 to be used in applications in the visible spectrum.

Use of the example described above provides a system 10 with the following characteristics: 14 mm effective focal length, 30 degree field of view, f/3.5 in the first position, 70 mm effective focal length, 6 degrees field of view, f/8 in the second position. An entrance pupil diameter of 8.7 mm with the second lens group 60 and optical stop 70 in the second position (narrow field of view) and 4 mm with the second lens group 60 and optical stop 70 in the first position (wide field of view). The exemplary system was optimized for visible wavelengths (0.49, 0.59, and 0.66 µm) and has a 7.3 mm square image.

Referring to FIGS. 3 and 4, a second exemplary dual field of view zoom lens system 10' is shown. In this second example, the system 10' has a first lens group 20, a second lens group 60, and an optical stop 70, as described above, and third lens group 40', which is a telephoto lens group.

First and third lens groups 20, 40' are aligned along an optical axis A and their positions relative to each other and to focal plane 50' are fixed. Second lens group 60 is aligned along optical axis A between first lens group 20 and third lens group 40' and is movable linearly between a first position (shown in FIG. 3) and a second position (shown in FIG. 4), for example through a linear drive screw, a worm-gear drive with a stepper motor, or any other well know device for providing linear motion to a lens group. Optical stop 70 is connected to second lens group 60 such that optical stop 70 moves along with second lens group 60.

In this example, first lens group 20 also has singlet lens 22, first doublet lens 24, and second doublet lens 30, which have the properties listed in Table 2 below. Singlet lens 22 is bi-concave, first doublet lens 24 is a compound meniscus lens, and second doublet lens 30 is a compound bi-convex lens. As can be seen from Table 2, the surfaces of first doublet lens 24 and second doublet lens 30 are spherical. In addition, surface 23 of singlet lens 22 is spherical and surface 21 is a conic. By making surface 21 a conic, finer control of spherical aberration or coma at the narrow field of view setting (when surface 21 is filled) is accomplished. Alternatively, other combinations of spherical and conic (or higher order aspheric) surfaces may be used, depending on the requirements of system 10' and manufacturing constraints such as cost.

Third lens group 40' is a telephoto lens group, which makes system 10' more compact and provides a longer focal length and larger image plane 50'. Third lens group 40' comprises a base lens group 40A, a telephoto lens group 40B, and a field-flattening lens group 40C. Base lens group 40A has a singlet lens 42 and a doublet lens 44, which have the properties listed in Table 2 below. Singlet lens 42 is a bi-convex lens and doublet lens 44 is a compound meniscus lens. Telephoto lens group 40B has a pair of singlet lenses 52, 54, which are both meniscus lenses and have the properties listed in Table 2 below. Field-flattening lens group 40C has a pair of singlet lenses 56, 58, which have the properties listed in Table 2 below. Singlet lens 56 is a meniscus lens and singlet lens 58 is a bi-convex lens.

As can be seen from Table 2, the surfaces of the lenses in telephoto lens group 40B, field-flattening lens group 40C, and doublet lens 44 are spherical. In addition, surface 41 of singlet lens 42 is spherical and surface 43 is a conic. By making surface 43 a conic, finer control of spherical aberration or coma at the narrow field of view setting (when surface 43 is filled) is accomplished. Alternatively, other combinations of spherical and conic (or higher order aspheric) surfaces may be used, depending on the requirements of system 10 and manufacturing constraints such as cost.

Second lens group 60 has a doublet lens formed by lens 62 and lens 64, which form a compound bi-concave lens and have the properties listed in Table 2 below. As can be seen from Table 2, the surfaces of lenses 62, 64 are spherical. Alternatively, the surfaces of lenses 62, 64 could be any combination of spherical and conical surfaces depending on the usage and requirements of the system 10. By using the lenses described above for second lens group 60, second lens group 60 has negative power. Alternatively, other lenses or combinations of lenses could be used such that second lens group 60 would be of positive power.

In the example shown, optical stop 70 has a fixed size aperture 72. By having a fixed size aperture 72 and connecting optical stop 70 to second lens group 60, optical stop 70 shapes the light paths 100 between first lens group 20 and third lens group 60, as described above.

TABLE 2

| Component | Radius of Curvature | Thickness (NFOV) | Thickness (WFOV) | Glass | Aperture | Conic |
|---|---|---|---|---|---|---|
| First Lens Group 20 | −79.77198 | 3 | | N-SK5 | 22 | −2.221716 |
| | 41.99095 | 3.9 | | | 24 | |
| | −40.49357 | 3.5 | | N-BK7 | 24 | |
| | −21.87852 | 1.5 | | | 24 | |
| | −19.81349 | 2.5 | | P-LASF47 | 24 | |
| | −25.76513 | 0.2 | | | 26 | |
| | 46.28619 | 7 | | N-BK10 | 28 | |
| | −26.26046 | 3 | 1.572847 | BASF12 | 28 | |
| Optical Stop 70 | INFINITY | 0.1955687 | 68.427153 | | 11.71622 | |
| | INFINITY | 0.1000107 | | | 11.92014 | |
| Second Lens Group 60 | INFINITY | 3.1 | | | 16 | |
| | −80.6955 | 2.5 | | N-BK7 | 16 | |
| | 16.72299 | 2 | | | 16 | |
| | 17.47797 | 2.5 | | N-SF1 | 16 | |
| | 25.27222 | 1 | | | 16 | |

TABLE 2-continued

| Component | Radius of Curvature | Thickness (NFOV) | Thickness (WFOV) | Glass | Aperture | Conic |
|---|---|---|---|---|---|---|
| Base Lens Group 40 A | 27.92126 | 5 | | N-PSK53 | 28 | −1 |
| | −105.1543 | 1 | | | 28 | |
| | −605.7182 | 2.5 | | N-SF19 | 28 | |
| | 24.86922 | 1 | | | 28 | |
| | 26.16411 | 5 | | N-SK10 | 28 | |
| | 550.1011 | 43.08781 | | | 28 | |
| Telephoto Lens Group 40B | −17.66212 | 2.5 | | K10 | 9.255505 | |
| | −33.36587 | 2.069972 | | | 9.652377 | |
| | −11.91922 | 2.5 | | N-LASF44 | 9.748378 | |
| | −58.44245 | 9.047573 | | | 11.14651 | |
| Field-Flattening Lens Group 40C | −77.25824 | 3.017193 | | N-FK51A | 17.63054 | |
| | −189.4453 | 0.9030828 | | | 18.29849 | |
| | 54.90267 | 4 | | N-LAK7 | 20.48947 | |
| | −23.22686 | 0 | | | 19.93017 | |
| | INFINITY | 4.847658 | | | 19.44396 | |

The operation of system 10' is the same as that described above for system 10 except that system 10' has a longer focal length and a larger image plane 50'. In order to optimize system 10' for use with wide and narrow field of view, the curvatures of the lenses in the first, second, and third lens groups 20, 60, 40' are optimized for use with the entire lens (outer and central portions). This optimizes the performance of the system when an entire lens is used and minimizes the distortion encountered when only the central portion of a lens is used. The use of conic surfaces on some of the lenses, as described above, also enhances this improvement as conic surfaces offer significant variation in curvature between the inner and outer portions of the lenses. Optimization of the curvature of the lenses in this matter provides better image quality, resolution, and clarity and allows system 10' to be used in applications in the visible spectrum.

Use of the second example described above provides a system 10' with the following characteristics: 50 mm effective focal length, 14.5 degree field of view, f/5.6 in the first position, 220 mm effective focal length, 3.5 degrees field of view, f/11 in the second position. This exemplary system 10' was optimized for visible wavelengths (0.49, 0.59, and 0.66 μm) and has a 15 mm square image.

The foregoing description of examples of the invention have been presented for purposes of illustration and description, and are not intended to be exhaustive or to limit the invention to the precise forms disclosed. The descriptions were selected to best explain the principles of the invention and their practical application to enable other skills in the art to best utilize the invention in various embodiments and various modifications as are suited to the particular use contemplated. It is intended that the scope of the invention not be limited by the specification, but be defined by the claims set forth below.

What is claimed is:

1. A dual field of view lens system, comprising:
a fixed first lens group aligned along an optical axis;
a fixed third lens group positioned a predetermined distance from the first lens group and aligned along the optical axis;
a second lens group, disposed between the first and third lens groups and aligned along the optical axis, the second lens group being moveable along the optical axis between a first position and a second position; and
an optical stop attached to the second lens group; wherein the second lens group is the only moving lens group in the lens system.

2. A dual field of view lens system as recited in claim 1, wherein the optical stop comprises a fixed size aperture.

3. A dual field of view lens system as recited in claim 1, wherein the optical stop shapes light paths between the first lens group and the third lens group.

4. A dual field of view lens system as recited in claim 1, wherein the first lens group has positive power.

5. A dual field of view lens system as recited in claim 1, wherein the first lens group comprises a singlet lens, a first doublet lens, and a second doublet lens.

6. A dual field of view lens system as recited in claim 1, wherein at least one surface of the first lens group is a conic.

7. A dual field of view lens system as recited in claim 6, wherein the at least one surface is hyperbolic.

8. A dual field of view lens system as recited in claim 1, wherein the third lens group has positive power.

9. A dual field of view lens system as recited in claim 1, wherein the third lens group comprises a singlet lens and a doublet lens.

10. A dual field of view lens system as recited in claim 9, wherein the singlet lens is a bi-convex lens and the doublet lens is a compound meniscus lens.

11. A dual field of view lens system as recited in claim 1, wherein at least one surface of the third lens group is a conic.

12. A dual field of view lens system as recited in claim 11, wherein the at least one surface is parabolic.

13. A dual field of view lens system as recited in claim 1, wherein the third lens group comprises a base lens group, a telephoto lens group, and a field-flattening lens group.

14. A dual field of view lens system as recited in claim 13, wherein the base lens group comprises a bi-convex singlet lens and a compound meniscus doublet lens.

15. A dual field of view lens system as recited in claim 13, wherein the telephoto lens group comprises a first meniscus singlet lens and a second meniscus singlet lens.

16. A dual field of view lens system as recited in claim 1, wherein the second lens group has negative power.

17. A dual field of view lens system as recited in claim 1, wherein the second lens group comprises a doublet lens.

18. A dual field of view lens system as recited in claim 17, wherein the doublet lens is a bi-concave cemented doublet lens.

19. A method of making a dual field of view lens system, comprising the steps of:
  positioning a first lens group along an optical axis;
  positioning a third lens group along the optical axis a fixed distance from the first lens group;
  connecting an optical stop to a second lens group; and
  positioning the second lens group and the optical stop between the first lens group and the third lens group such that the second lens group and the optical stop are moveable along the optical axis between a first position and a second position and the second lens group is the only moving lens group in the lens system.

20. A method of making a dual field of view lens system as recited in claim 19, wherein the optical stop comprises a fixed size aperture.

21. A method of making a dual field of view lens system as recited in claim 19, wherein positioning the second lens group in the first position provides a wide field of view and positioning the second lens group in the second position provides a narrow field of view.

22. A method of using a dual field of view lens system, comprising the steps of:
  positioning a second lens group and an optical stop in a first position between a fixed first lens group and a fixed third lens group to obtain a wide field of view; and
  moving only the second lens group and the optical stop to a second position between the first lens group and the third lens group to obtain a narrow field of view.

23. A method of using a dual field of view lens system as recited in claim 22, further comprising the step of adjusting the position of the second lens group and the optical stop about the first position to adjust the focus.

24. A method of using a dual field of view lens system as recited in claim 22, further comprising the step of adjusting the position of the second lens group and the optical stop about the second position to adjust the focus.

* * * * *